March 8, 1927.

A. F. GERDES 1,619,926

MAGNETO ELECTRIC MACHINE

Filed Feb. 1, 1922    2 Sheets-Sheet 1

Inventor:
Adolf F. Gerdes
By Moakley and Gill
Attorneys

March 8, 1927. 1,619,926
A. F. GERDES
MAGNETO ELECTRIC MACHINE
Filed Feb. 1, 1922 2 Sheets-Sheet 2
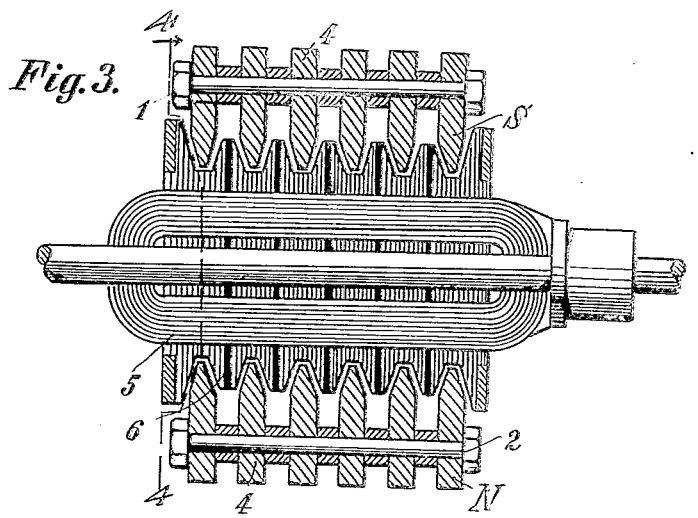
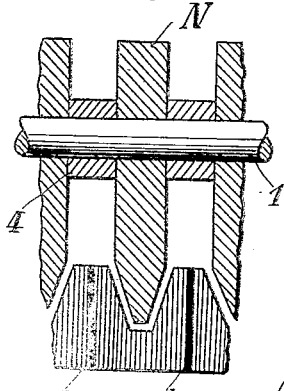
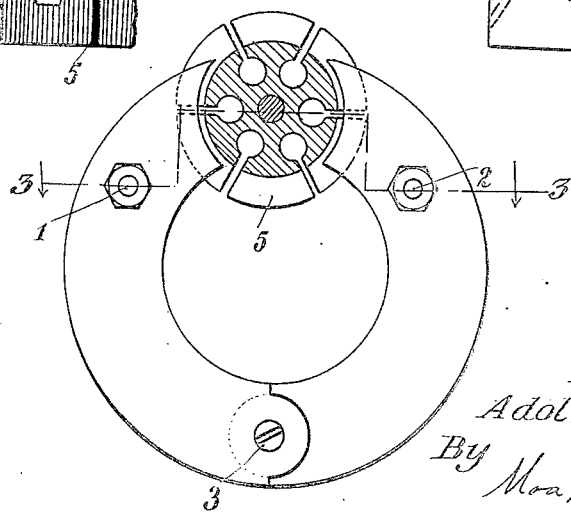
Inventor:
Adolf F Gerdes
By Moakley and Gill
Attorneys Patented Mar. 8, 1927.

1,619,926

UNITED STATES PATENT OFFICE.

ADOLF FRIEDRICH GERDES, OF BERLIN, GERMANY.

MAGNETO-ELECTRIC MACHINE.

Application filed February 1, 1922, Serial No. 533,394, and in Germany June 20, 1916.

Magneto-electric machines, in which the field-magnets are composed of a plurality of permanent magnets, are already known. Machines of this kind have hitherto been constructed in such a manner that the pole pieces of the single permanent magnets were magnetically connected together with their ends having the same polarity in close proximity to the armature. It has been found by different tests, that the efficiency of a machine of this kind is considerably increased, if, as in the case of the present invention, the several unipolar ends of the permanent magnets lying in juxtaposition are completely insulated from each other, as far as the magnetic conductivity is concerned and if at the same time the permanent magnets are arranged at a greater distance from each other than the air-space between the field poles and the armature, and if finally the armature-core is composed of completely insulated aggregates of iron-sheets, each of which is mounted in opposition to a permanent magnet. For the purpose of increasing the surface of the pole pieces each aggregate of the armature may be provided with a wedge-shaped groove and the sharpened ends of the pole surfaces of the magnets may fit into the said wedge-shaped grooves or indentations.

The formation of eddy-currents by the field-pole-surfaces arranged in a zigzag-line and by the pole-surfaces of the armature are avoided by arranging the single insulated aggregates in the direction of the magnetic line of force in opposition to the sharpened ends of the field-magnet-poles.

Figure 1:
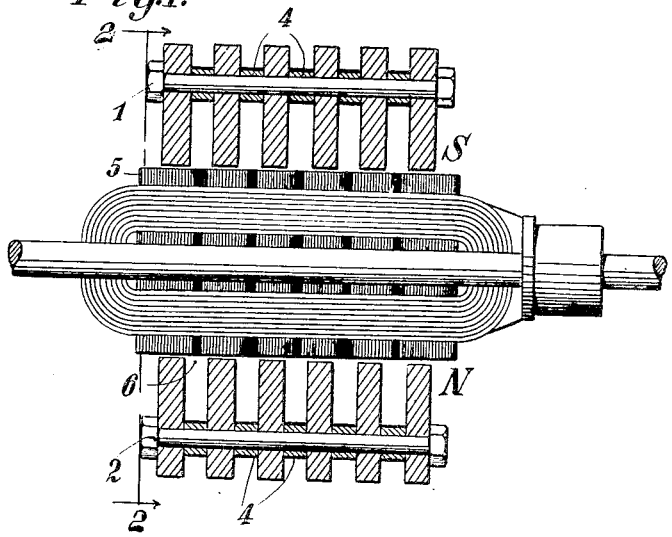
Figure 2:
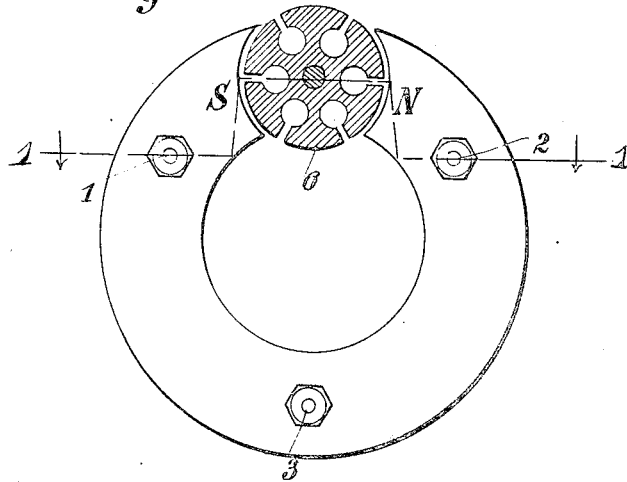

The magneto-electric machine forming the object of the present invention is represented in the annexed drawing by way of example, in which:

Fig. 1 is a longitudinal section approximately along the line 1—1 of Fig. 2,

Fig. 2 is a view showing the armature in transverse section approximately along the line 2—2 of Fig. 1, Fig. 3 shows a modification in longitudinal section approximately along the line 3—3 of Fig. 4, Fig. 4 is a view showing the armature in transverse section approximately along the line 4—4 of Fig. 3, Fig. 5 is an enlarged detail view of the modification of Figs. 3 and 4 and Fig. 6 is a diagrammatic view of the lines of force.

The field body of the represented magneto-electric machine is composed of a plurality of permanent steel magnets N S connected together by the non-conducting bolts 1, 2 and 3 and the uniformly shaped collars 4 at a suitable distance from one another; the connection being such that the pole-ends of the permanent magnets lying at the same side will show the same polarity. The core 5 of the armature is composed of an aggregate of iron-sheets. The aggregates are insulated from each other by extra-strong insulating discs 6, so that each of these aggregates revolves between the poles of a single permanent magnet. According to the modification shown in Figs. 3, 4 and 5 each aggregate is provided in its periphery with a groove which coacts with the pole-surfaces of the magnets of the field-body, which have similar contour in cross-section as the said aggregates of iron-sheets which are oppositely arranged to the poles of the field-magnets in the direction of the exit of the lines of force. For the purpose of accommodating the field-pole-surfaces to the zigzag-shaped pole-surfaces of the armature, the field-body consists of two parts which may be connected by a bolt 3 (Fig. 4) acting as a hinge so that both parts may be brought nearer together or removed from each other if necessity occurs.

It is to be understood that wherever permanent magnets are mentioned electro-magnets may also be used in place of them.

I claim:

1. In a magneto-electric machine, a field magnet structure and an armature coacting with the pole pieces thereof, said structure consisting of a plurality of independent magnets each composed of a plurality of parts adjustably connected together, said magnets being magnetically insulated from each other and each separated from adjacent magnets by a distance greater than that which separates the pole pieces from the armature, said armature being composed of a plurality of insulated aggregates each coacting with one of the magnets.

2. In a magneto-electric machine, a field magnet structure and an armature coacting with the pole pieces thereof, said structure consisting of a plurality of independent magnets each composed of two parts adjustably connected together, said magnets being magnetically insulated from each other and each separated from adjacent magnets by a distance greater than that which separates the pole pieces from the armature, and said armature being composed of a plurality of insulated aggregates each coacting with one of the magnets.

3. In a magneto-electric machine, a field magnet structure and an armature coacting with the pole pieces thereof, said structure consisting of a plurality of independent magnets each composed of two parts adjustably connected together, and having wedge shaped pole pieces, said magnets being magnetically insulated from each other and each separated from adjacent magnets by a distance greater than that which separates the pole pieces from the armature and said armature being composed of a plurality of insulated aggregates each having in its periphery a wedge shaped groove coacting with the similarly shaped pole pieces of one of the magnets.

In witness whereof I have subscribed my name.

ADOLF FRIEDRICH GERDES.